US011707845B2

(12) United States Patent
Enomoto et al.

(10) Patent No.: US 11,707,845 B2
(45) Date of Patent: Jul. 25, 2023

(54) ASSEMBLY PLANNING DEVICE, ASSEMBLY PLANNING METHOD, AND NON-TRANSITORY COMPUTER-READABLE STORAGE MEDIUM

(71) Applicant: Hitachi, Ltd., Tokyo (JP)

(72) Inventors: Atsuko Enomoto, Tokyo (JP); Yuta Yamauchi, Tokyo (JP); Reiko Inoue, Tokyo (JP)

(73) Assignee: HITACHI, LTD., Tokyo (JP)

( * ) Notice: Subject to any disclaimer, the term of this patent is extended or adjusted under 35 U.S.C. 154(b) by 368 days.

(21) Appl. No.: 16/899,723

(22) Filed: Jun. 12, 2020

(65) Prior Publication Data

US 2020/0406460 A1 Dec. 31, 2020

(30) Foreign Application Priority Data

Jun. 27, 2019 (JP) .................................. 2019-119537

(51) Int. Cl.
*G06Q 10/0631* (2023.01)
*B25J 9/16* (2006.01)

(52) U.S. Cl.
CPC ........ *B25J 9/1669* (2013.01); *G06Q 10/0631* (2013.01); *G05B 2219/31053* (2013.01)

(58) Field of Classification Search
CPC .................. G06Q 10/0631; G05B 2219/31053
See application file for complete search history.

(56) References Cited

U.S. PATENT DOCUMENTS

| 4,503,507 A * | 3/1985 | Takeda ............. G05B 19/40936 901/8 |
| 2016/0364670 A1* | 12/2016 | Lin .................. G06Q 10/06316 |
| 2018/0046963 A1 | 2/2018 | Kobayashi et al. |

FOREIGN PATENT DOCUMENTS

| JP | 2010-137298 A | 6/2010 |
| JP | 2015-153237 A | 8/2015 |
| JP | 6266104 B2 | 1/2018 |

(Continued)

OTHER PUBLICATIONS

P. Jiménez, Survey on assembly sequencing: a combinatorial and geometrical perspective, J Intell Manuf (2013) vol. 24, pp. 235-250. (Year: 2013).*

(Continued)

*Primary Examiner* — Nadja N Chong Cruz
(74) *Attorney, Agent, or Firm* — Mattingly & Malur, PC

(57) ABSTRACT

An assembly planning device: holds a partial-order graph showing assembly operations of parts and an order constraint based on a partial-order relationship of the assembly operations, an operation sequence template showing an operation sequence and a required time of the operation sequence, and part information showing parts that can be assembled by robots; refers to the part information to generate allocation plans in which the robot are allocated to the assembly operations shown by the partial-order graph; for each of the allocation plans, refers to the operation sequence template to allocate an operation sequence for each assembly operation shown by the allocation plan; calculates movement times of the robots in the allocated operation sequence; calculates an operation time in the allocation plan based on the movement times and the required time shown by the operation sequence template; and selects an allocation plan based on the operation times.

13 Claims, 12 Drawing Sheets

(56) References Cited

FOREIGN PATENT DOCUMENTS

| | | |
|---|---|---|
| JP | 2018-26071 A | 2/2018 |
| WO | 2015/177855 A1 | 11/2015 |

OTHER PUBLICATIONS

Japanese Office Action received in corresponding Japanese Application No. 2019-119537 dated Dec. 20, 2022.

* cited by examiner

[FIG. 1]
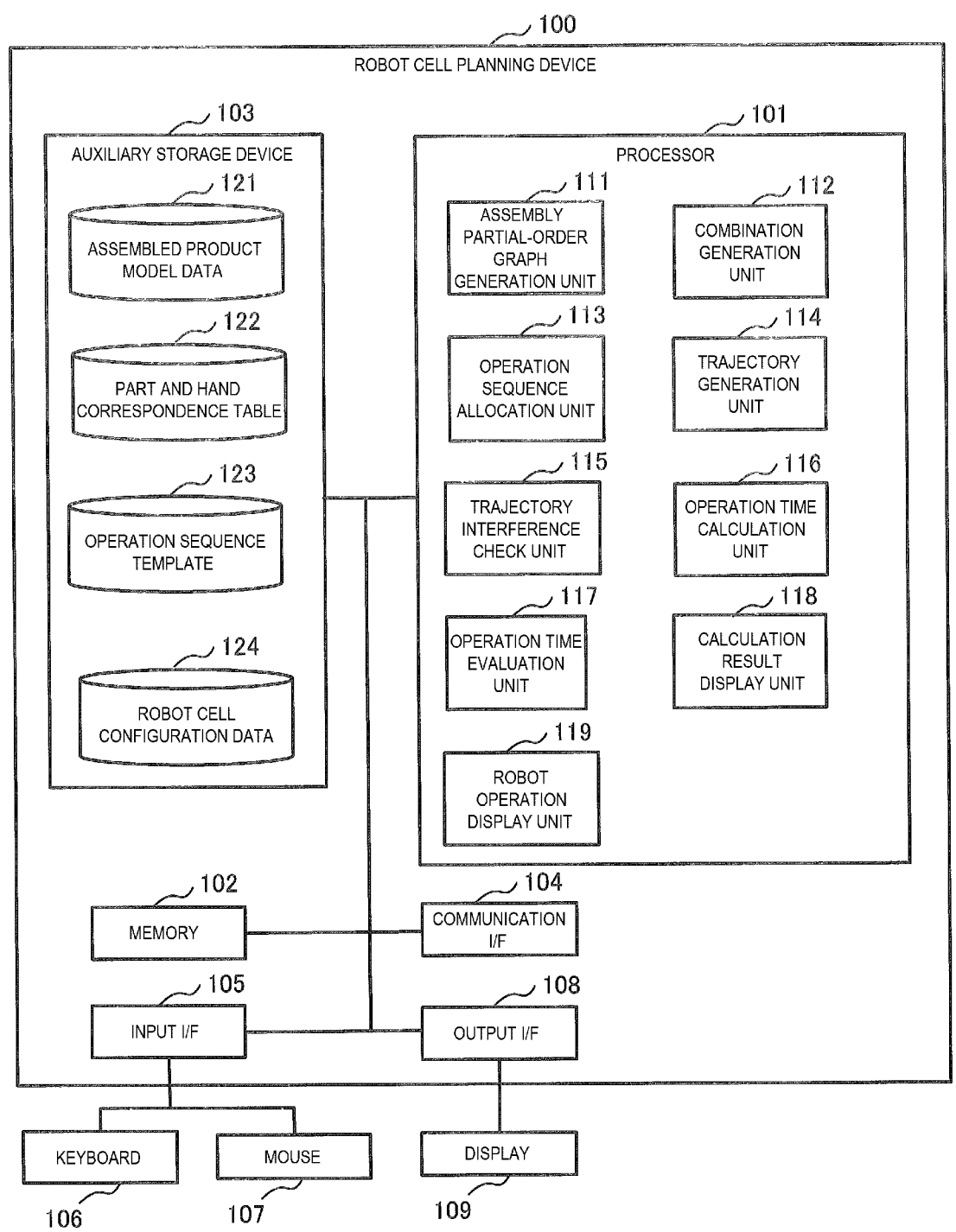

[FIG. 2]

| PART AND HAND CORRESPONDENCE TABLE ||||
|---|---|---|---|
| ROBOT | HAND | PART | PART FEEDER |
| A | a | X | f1, f2 |
| A | b | Y, Z | f3, f4, f5 |
| ... | ... | ... | ... |

| OPERATION SEQUENCE TEMPLATE ||||
|---|---|---|---|
| OPERATION SEQUENCE | CONDITION |||
| | ATTACHED HAND | USED HAND | ASSEMBLING PART |
| attach hand a (x sec) → feed A1→ ... | NONE | a | A1, A2 |
| ... | ... | | |

| ROBOT CELL CONFIGURATION DATA ||||||
|---|---|---|---|---|---|
| TYPE | ID | POSITION | POSTURE | MOVEMENT SPEED | MECHANISM PARAMETER |
| ROBOT | A | (x3, y3, z3) | R1 | X m/s | (a1, b1, c1, ...) |
| HAND | b | (x3, y3, z3) | R2 | – | (a2, b2, c2, ...) |
| ... | ... | ... | ... | ... | ... |

1241  1242  1243  1244  1245  1246

[FIG. 4B]
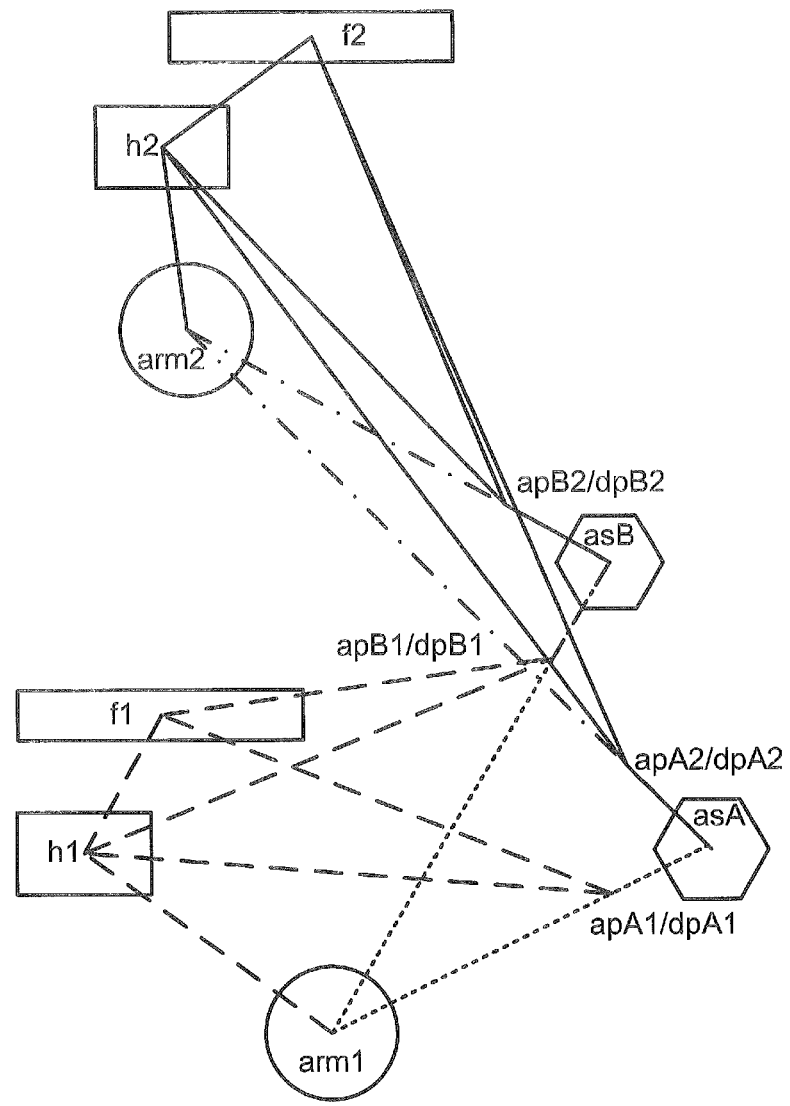

[FIG. 5]
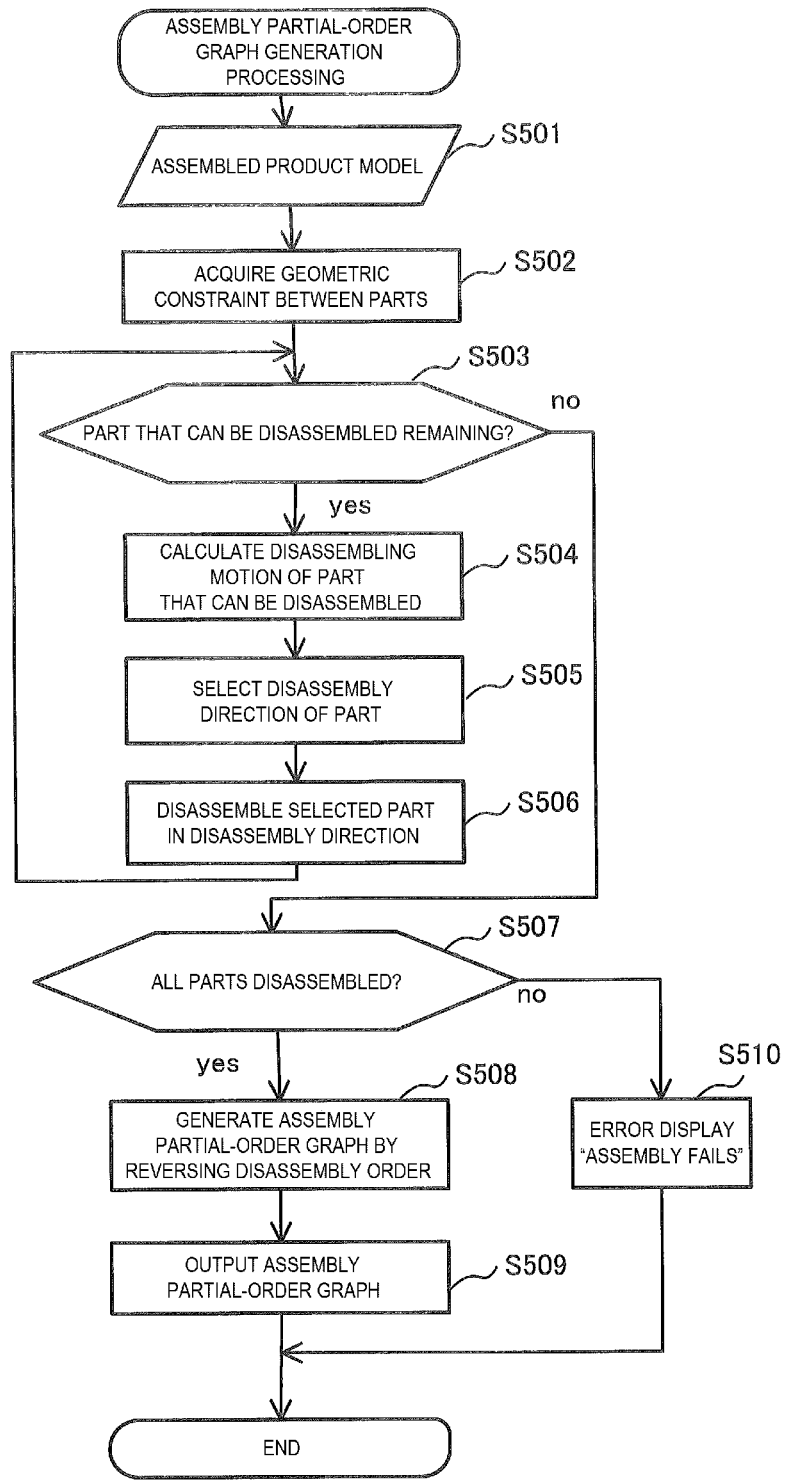

[FIG. 6]
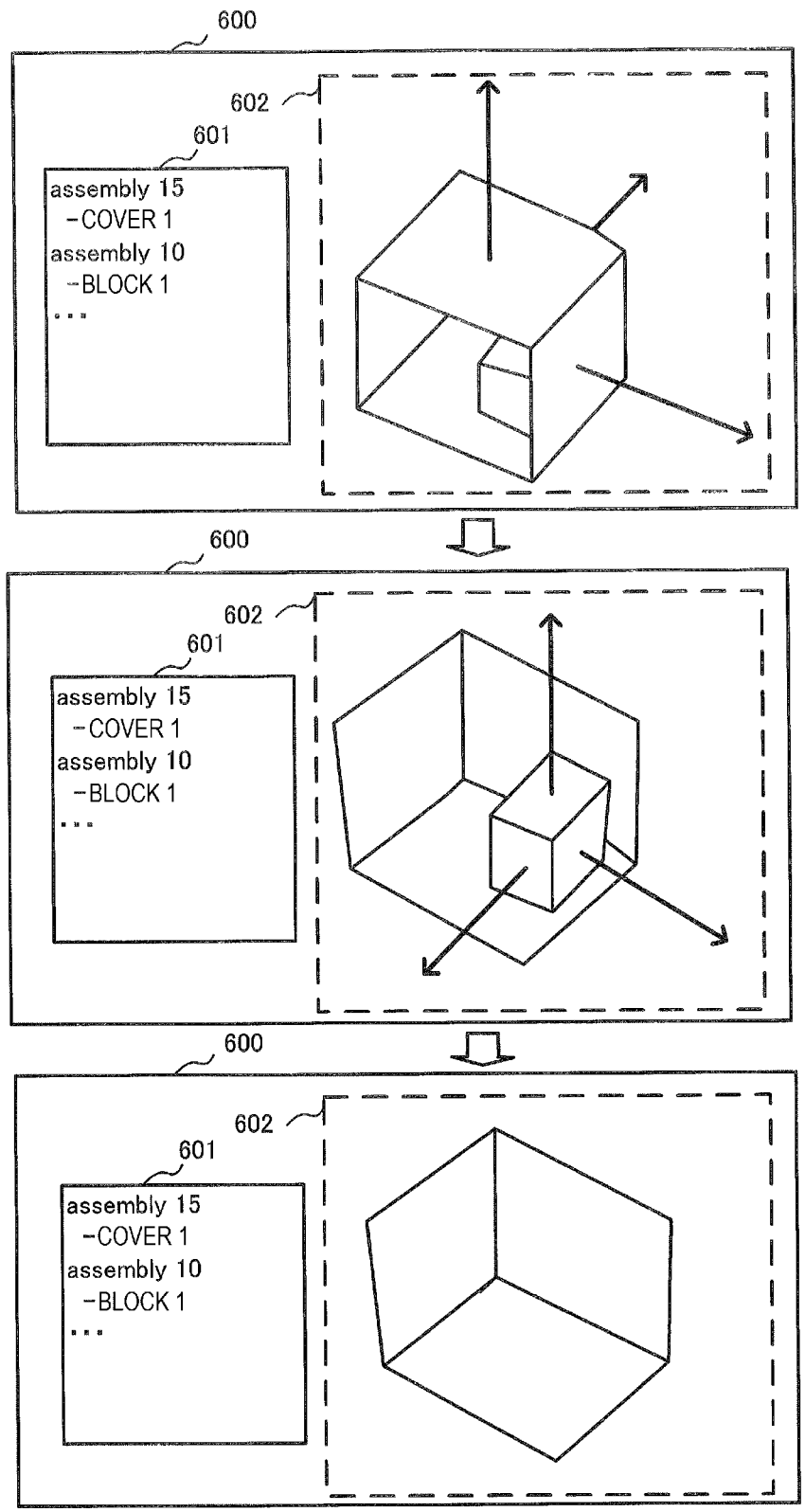

[FIG. 7]
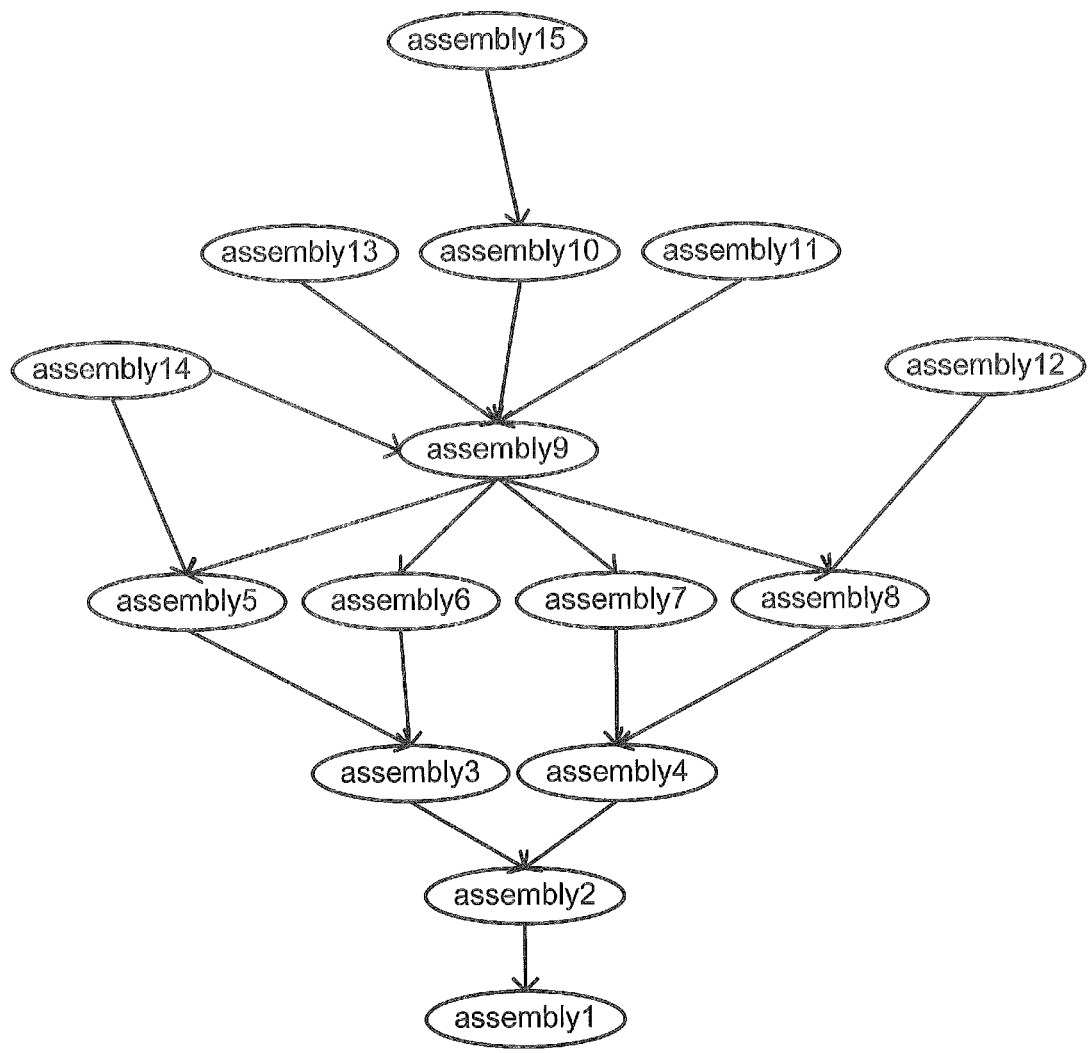

[FIG. 8]
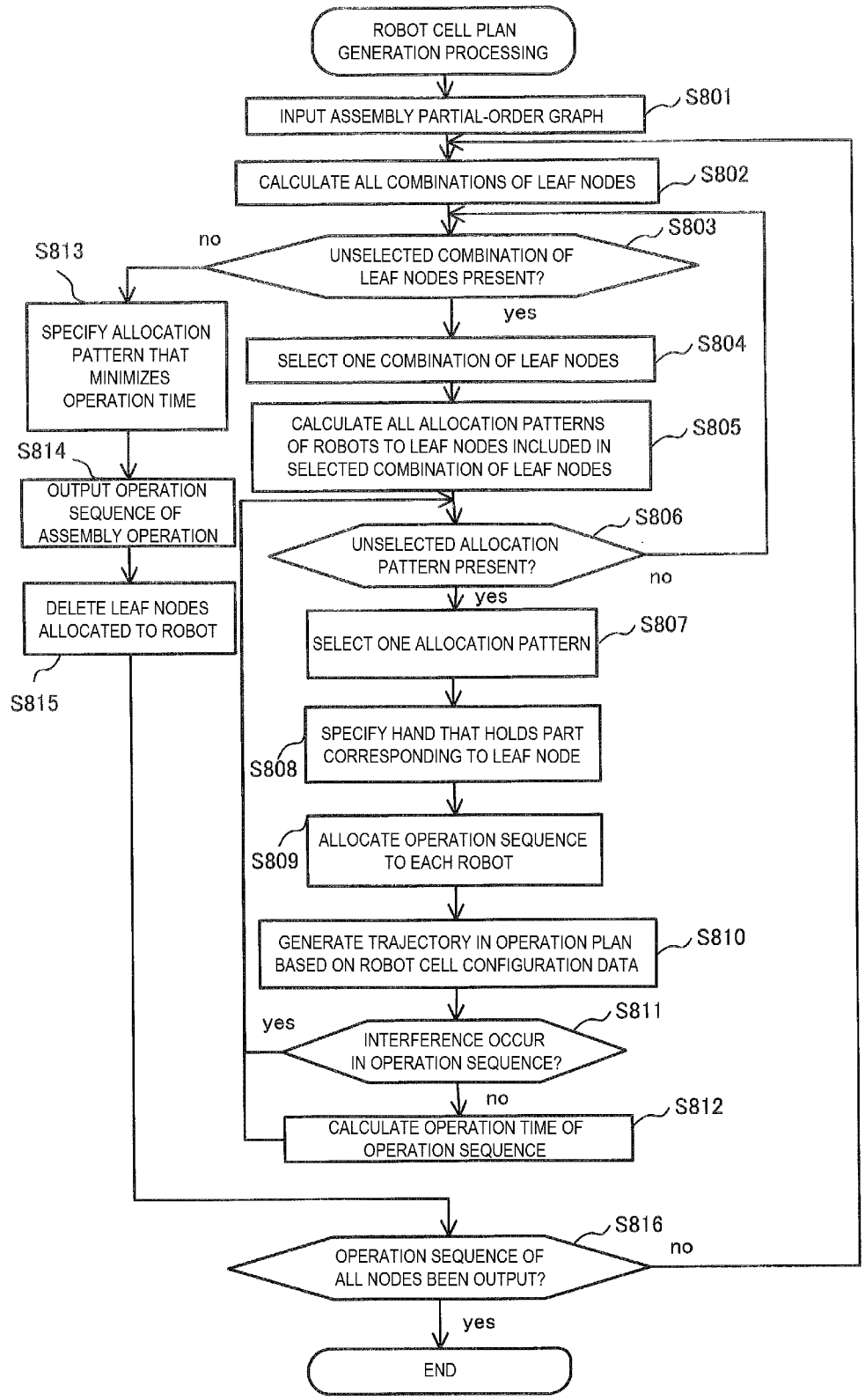

[FIG. 9]
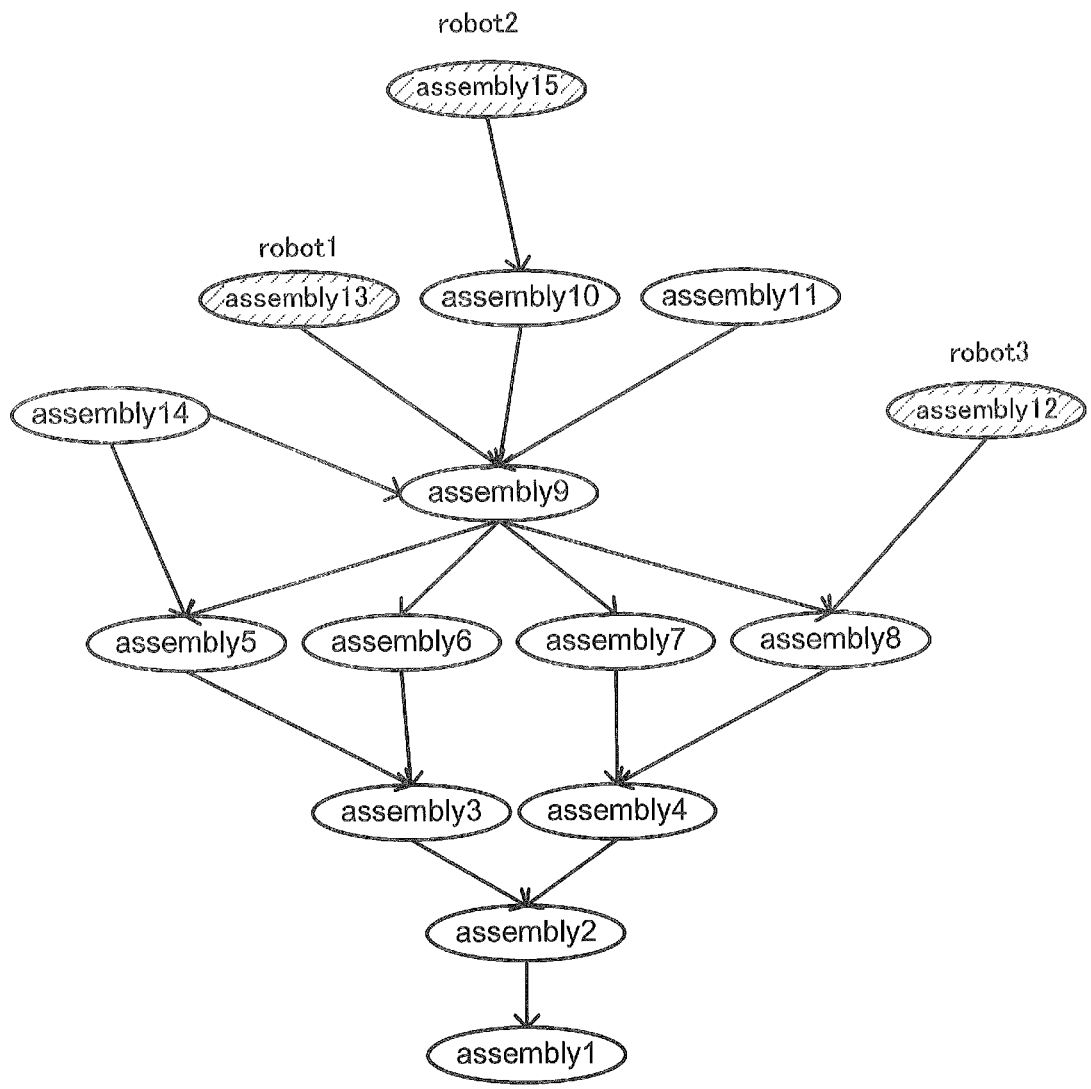

[FIG. 10]
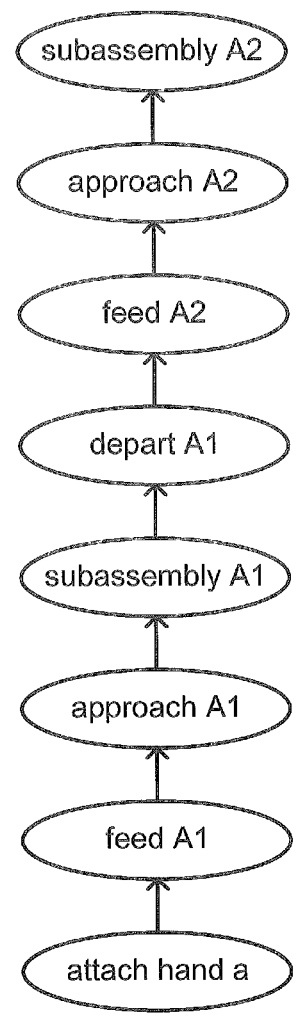

[FIG. 11]
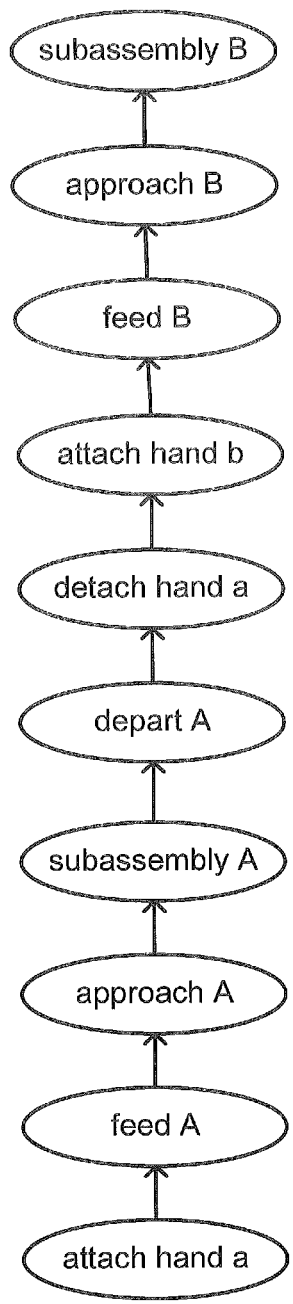

[FIG. 12]
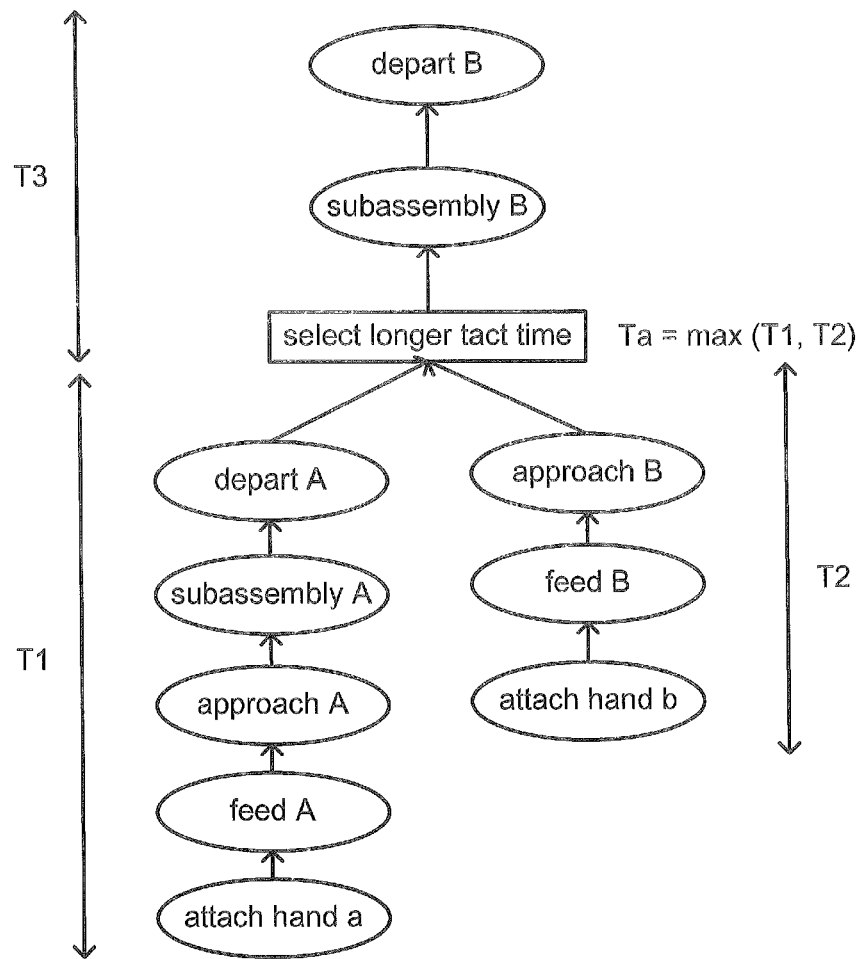

[FIG. 13]
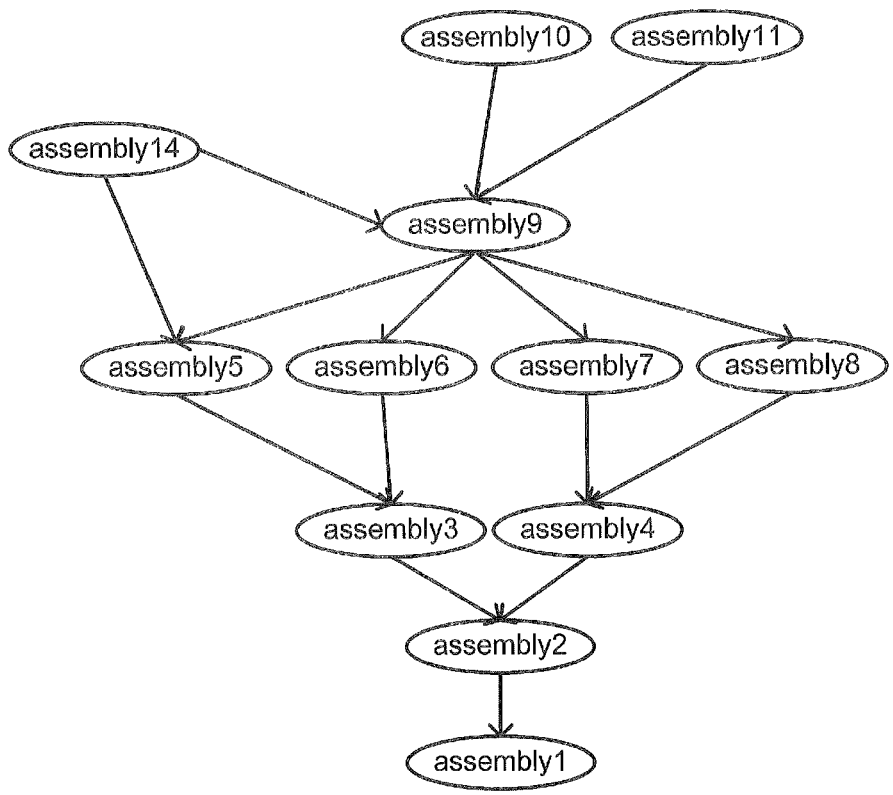
[FIG. 14]
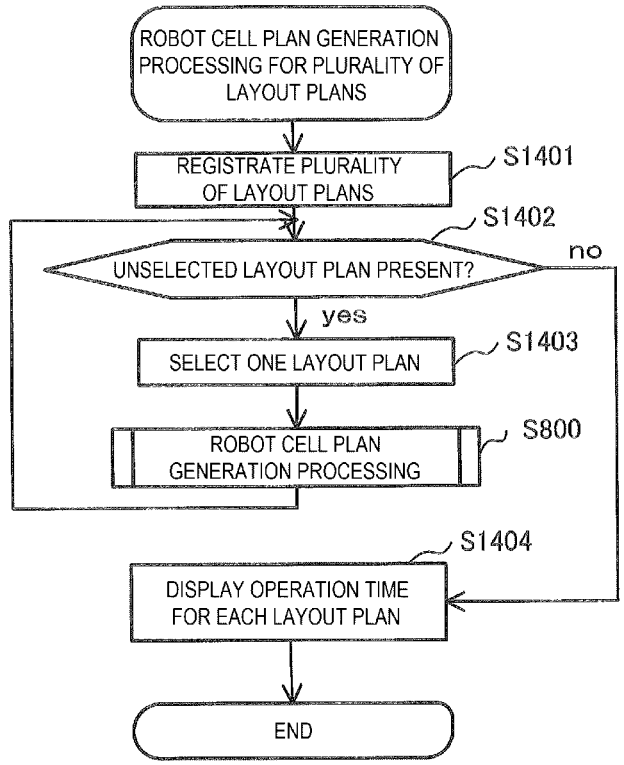

ASSEMBLY PLANNING DEVICE, ASSEMBLY PLANNING METHOD, AND NON-TRANSITORY COMPUTER-READABLE STORAGE MEDIUM

CLAIM OF PRIORITY

The present application claims priority from Japanese patent application JP2019-119537 filed on Jun. 27, 2019, the content of which is hereby incorporated by reference into this application.

TECHNICAL FIELD

The present invention relates to an assembly planning device, an assembly planning method, and an non-transitory computer readable storage medium.

BACKGROUND ART

JP-A-2010-137298 (PTL 1) discloses a background art of this technical field. PTL 1 discloses that "preparing a three-dimensional model for a plurality of parts; selecting manipulators for holding and operating respective parts connected to each other from a plurality of manipulators; setting up positions of points through which the parts move in assembly operations and postures of the parts at the points; allocating numbers for the points in an order of reaching of the manipulators, and preparing a point data list for each manipulator including point numbers, names of parts to be operated, point positions, and postures; and combining operating macros according to operation contents to be executed by the manipulators at the points, so as to prepare an operating program for the plurality of manipulators".

CITATION LIST

Patent Literature

PTL 1: JP-A-2010-137298
PTL 2: Japanese Patent No. 6266104

SUMMARY OF INVENTION

Technical Problem

An assembly line in which robots each performing a dedicated task are arranged has a high investment cost, and thus is not suitable for introduction into a non-mass-produced product. In order to assemble a non-mass-produced product, a multifunctional robot cell that performs a plurality of tasks by one robot unit is proposed. However, since an operation of the robot is slower than that of an operator, throughput of an assembly operation by one robot is not high.

On the other hand, although the throughput can be improved by performing the assembly operation by a plurality of robots, an assembly operation planning method by a plurality of robots is not disclosed in PTL 1. Accordingly, an object of one aspect of the invention is to plan an assembly operation with a high throughput by a plurality of robots.

Solution to Problem

In order to solve the above problems, one aspect of the invention includes the following configurations. An assembly planning device configured to plan assembly of parts by a plurality of robots includes: a processor and a memory, in which the memory holds: a partial-order graph showing assembly operations of the parts and an order constraint based on a partial-order relationship of the assembly operations; an operation sequence template showing an operation sequence showing a series of operations capable of being executed by the robots in the assembly operation of each of the parts and a required time of the operation sequence; part information showing ones of the parts capable of being assembled by each of the plurality of robots; and layout information of a cell in which the assembly operation is executed, and the processor is configured to: refer to the part information so as to generate a plurality of allocation plans in which the robots capable of assembling the part in each of the assembly operations shown by the partial-order graph are allocated to the assembly operation; for each of the plurality of the allocation plans, refer to the operation sequence template so as to allocate the operation sequence for each assembly operation shown by the allocation plan, refer to the layout information so as to calculate movement times of the robots shown by the allocation plan in the allocated operation sequence, and calculate an operation time in the allocation plan based on the movement times and the required time shown by the operation sequence template; and select an allocation plan included in the plurality of allocation plans based on the operation times.

Advantageous Effect

According to one aspect of the invention, it is possible to plan an assembly operation with a high throughput by a plurality of robots.

Problems, configurations, and effects other than those described above will become apparent from the following description of embodiments.

BRIEF DESCRIPTION OF DRAWINGS

FIG. 1 is a block diagram showing a configuration example of a robot cell planning device according to a first embodiment.

FIG. 2 is an example of a part and hand correspondence table according to the first embodiment.

FIG. 3 shows an example of an operation sequence template according to the first embodiment.

FIG. 4A is an example of robot cell configuration data according to the first embodiment.

FIG. 4B is an example of a layout shown by the robot cell configuration data according to the first embodiment.

FIG. 5 is a flowchart showing an example of an assembly partial-order graph generation processing according to the first embodiment.

FIG. 6 shows an example of a display screen for a user to select a part to be disassembled and a disassembly direction according to the first embodiment.

FIG. 7 is an example of an assembly partial-order graph showing an assembly operation according to the first embodiment.

FIG. 8 is a flowchart showing an example of a robot cell plan generation processing according to the first embodiment.

FIG. 9 is an example of allocation of a robot to a combination of leaf nodes in an assembly partial-order graph according to the first embodiment.

FIG. 10 is an example of an operation sequence according to the first embodiment.

FIG. 11 is an example of an operation sequence according to the first embodiment.

FIG. 12 is a diagram showing a method of calculating an operation time when an assembly operation of two parts has a partial-order relationship according to the first embodiment.

FIG. 13 is an example of an updated assembly partial-order graph according to the first embodiment.

FIG. 14 is a flowchart showing an example of a robot cell planning processing for a plurality of layout plans according to a second embodiment.

DESCRIPTION OF EMBODIMENTS

Hereinafter, embodiments of the invention will be described in detail with reference to the accompanying drawings. In the present embodiment, same components are denoted by same reference numerals in principle, and a repetitive description thereof is omitted. It should be noted that the present embodiment is merely an example for implementing the invention, and does not limit the technical scope of the invention.

First Embodiment

FIG. 1 is a block diagram showing a configuration example of a robot cell planning device according to the present embodiment. A robot cell planning device 100 is implemented by a computer including a processor (CPU) 101, a memory 102, an auxiliary storage device 103, and a communication interface 104.

The processor 101 executes a program stored in the memory 102. The memory 102 includes a ROM which is a non-volatile storage element, and a RAM which is a volatile storage element. The ROM stores an invariable program (for example, a BIOS). The RAM is a high-speed and volatile storage element such as a dynamic random access memory (DRAM), and temporarily stores a program to be executed by the processor 101 and data used when the program is executed.

The auxiliary storage device 103 is a large-capacity and non-volatile storage device such as a magnetic storage device (HDD) and a flash memory (SSD), and stores a program to be executed by the processor 101 and data used when the program is executed. That is, the program is read from the auxiliary storage device 103, loaded into the memory 102 and executed by the processor 101.

The robot cell planning device 100 may include an input interface 105 and an output interface 108. The input interface 105 is an interface to which a keyboard 106, a mouse 107, and the like are connected, and receives an input from an operator. The output interface 108 is an interface to which a display 109, a printer, or the like are connected, and outputs an execution result of a program in a form that can be visually recognized by the operator. The communication interface 104 is a network interface device that controls communication with other devices according to a predetermined protocol.

The program executed by the processor 101 is provided to the robot cell planning device 100 via a removable medium (such as a CD-ROM and a flash memory) or a network, and is stored in the non-volatile auxiliary storage device 103 that is a non-temporary storage medium. Therefore, the robot cell planning device 100 may include an interface for reading data from the removable medium.

The robot cell planning device 100 is a computer system that is physically configured on a single computer or on a plurality of logically or physically configured computers, and may operate in a separate thread on the same computer, or may operate on a virtual computer constructed on a plurality of physical computer resources.

The processor 101 includes, for example, an assembly partial-order graph generation unit 111, a combination generation unit 112, an operation sequence allocation unit 113, a trajectory generation unit 114, a trajectory interference check unit 115, an operation time calculation unit 116, an operation time evaluation unit 117, a calculation result display unit 118, and a robot operation display unit 119.

For example, the processor 101 functions as the assembly partial-order graph generation unit 111 by operating according to an assembly partial-order graph generation program loaded into the memory 102, and functions as the combination generation unit 112 by operating according to a combination generation program loaded into the memory 102. The similar applies to the other units included in the processor 101.

The assembly partial-order graph generation unit 111 generates an assembly partial-order graph. The assembly partial-order graph is a partial-order graph in which each assembly is a node and an execution order of the assemblies is shown by an arc. The assemblies include assembly operations of parts and operations required for the assembly operations (for example, attaching of a hand). The assembly partial-order graph shows an order constraint of the assembly operation.

The combination generation unit 112 generates a combination of the assembly shown by one of nodes of the assembly partial-order graph and a robot that execute the assembly. The operation sequence allocation unit 113 allocates an operation sequence to the robot that executes the assembly. The operation sequence defines an operation performed by the robot during the execution of the assembly.

The trajectory generation unit 114 generates a trajectory in which the robot to which the operation sequence is allocated moves. The trajectory interference check unit 115 checks whether the generated trajectories interfere with each other. The operation time calculation unit 116 calculates an operation time for the assembly by the robot to which the operation sequence is allocated. The operation time evaluation unit 117 evaluates the operation time required for the assembly to specify an optimal combination of the assembly and the robot. The calculation result display unit 118 displays a processing result of each functional unit on the display 109 or the like. The robot operation display unit 119 displays information indicating the trajectory and operation of the robot to which the operation sequence is allocated on the display 109 or the like.

The auxiliary storage device 103 holds, for example, assembled product model data 121, a part and hand correspondence table 122, an operation sequence template 123, and robot cell configuration data 124.

The assembled product model data 121 is Standard Tri-angulated Language (STL) information representing a three-dimensional shape of an assembled product and parts constituting the assembled product. In the assembled product model data 121, a geometric constraint between the parts constituting the assembled product is defined. In the assembled product model data 121, attribute information (for example, a pitch of a screw) of a necessary part acquired from computer aided design (CAD) is also defined.

The part and hand correspondence table 122 shows a correspondence between a robot, a device that can be attached to the robot (for example, a hand or an arm), and a part to be assembled by using the device. The operation sequence template 123 defines an operation sequence that shows an operation of the robot to execute each assembly.

The robot cell configuration data 124 includes position information of a robot, a device that is attached to the robot during an assembly operation (for example, a hand or an arm), and a part of an assembled product. Specifically, the robot cell configuration data 124 includes layout information of a cell, such as a detachable position of the device that can be attached to the robot, a position of a part feeder, an assembly position of a part, and an approach position of the assembly position of the part.

In the present embodiment, information used by the robot cell planning device 100 may be represented by any data structure without depending on the data structure. For example, a data structure appropriately selected from a table, a list, a database, or a queue can store the information.

FIG. 2 is an example of the part and hand correspondence table 122. The part and hand correspondence table 122 includes, for example, a robot column 1221, a hand column 1222, a part column 1223, and a part feeder column 1224. The robot column 1221 holds information for identifying the robot. The hand column 1222 holds information for identifying a hand that can be attached to a corresponding robot. The part column 1223 holds information for identifying a part that can be handled by the robot to which the corresponding hand is attached. The part feeder column 1224 holds information for identifying a part feeder that supplies the part.

The hand is described as an example of a device to be attached to the robot, and in the following description, the hand may be replaced with another device that can be attached to the robot. The robot is, for example, a multi-functional robot to and from which a plurality of types of devices can be attached and detached.

FIG. 3 is an example of the operation sequence template 123. The operation sequence template 123 includes, for example, an operation sequence column 1231 and a condition column 1232. The operation sequence column 1231 lists an operation sequence, and a required time for attachment and detachable operations of the hand included in the operation sequence and an operation requiring a fixed time such as waiting for a signal. In the condition column 1232, a condition for executing a corresponding operation sequence is listed. Specifically, for example, the condition column 1232 includes an attached hand column 1233, a used hand column 1234, and an assembling part column 1235.

The attached hand column 1233 holds information indicating a hand attached at a time point when the robot starts the operation sequence (including a state in which no hand is attached). The used hand column 1234 holds information indicating a hand used by the robot in the operation sequence. The assembling part column 1235 holds information indicating a part to be assembled by the robot in the operation sequence.

FIG. 4A is an example of the robot cell configuration data 124. The robot cell configuration data 124 includes, for example, a type column 1241, an ID column 1242, a position column 1243, a posture column 1244, a movement speed column 1245, and a mechanism parameter column 1246. The type column 1241 holds a type of elements constituting a robot cell. Each of the "robot", the "hand", the "arm", the "part feeder", the "part", and the "approach" is an example of the type.

The ID column 1242 holds an ID for identifying an element of a corresponding type. The position column 1243 holds information showing positions in the cell in which corresponding elements are arranged. The posture column 1244 holds postures of the corresponding elements in a form of, for example, a three-row three-column orthogonal matrix.

The movement speed column 1245 holds a movement speed (for example, a rated movement speed) of a movable element (for example, the type is the "robot"). The mechanism parameter column 1246 holds mechanism parameters of a corresponding device. By using a mechanism parameter and a position in the cell, a hand tip position can be derived from a joint angle of the robot at each time point, and a movement distance to a target hand position can be derived. As will be described later, a movement time can be obtained by dividing the movement distance by a rated hand tip speed.

FIG. 4B is an example of a layout shown by the robot cell configuration data 124. In the layout, "h" indicates a hand, "arm" indicates an arm, "f" indicates a part feeder, "as" indicates an assembly position of a part, and "ap" and "dp" indicate approach positions to which the robot moves before and after assembling the parts. A straight line such as a solid line, a dotted line, and a dashed-dotted line in the layout is an example of a movement line in which the robot moves between the cells.

For example, a user can set these layouts by 3D-CAD. The user does not need to specify an individual combination of which robot uses which hand or which part feeder in the operation sequence. These combinations are automatically determined by a processing to be described later.

FIG. 5 is a flowchart showing an example of an assembly partial-order graph generation processing. The assembly partial-order graph generation unit 111 acquires an assembly model of an assembled product that is a generation target of an assembly partial-order graph from the assembled product model data 121 (S501). The assembly partial-order graph generation unit 111 acquires geometric constraint information between the parts constituting the assembly from the assembly model (S502).

The assembly partial-order graph generation unit 111 determines whether a part that can be disassembled from the assembly remains (S503). When it is determined that a part that can be disassembled remains (S503: yes), the assembly partial-order graph generation unit 111 calculates a disassembly motion of the part that can be disassembled among non-disassembled parts (S504). In step S504, the assembly partial-order graph generation unit 111 can calculate a disassembly motion including one or more disassembly directions by using a known technique (for example, the technique described in PTL 2).

Subsequently, the assembly partial-order graph generation unit 111 selects a part to be disassembled from parts that can be disassembled, and selects a disassembly direction of the part (S505). Specifically, for example, when a plurality of disassembly motions are calculated for a plurality of parts that can be disassembled at a certain time point, the assembly partial-order graph generation unit 111 shows the user a part that can be disassembled and a possible disassembly direction (a display screen 600 to be described later), and selects a disassembly direction selected by the user. The assembly partial-order graph generation unit 111 disassembles the part from the assembled product (S506), and the processing returns to step S503.

FIG. 6 shows an example of a display screen for the user to select the part to be disassembled and the disassembly direction. The display screen 600 includes, for example, a part selection area 601 and an assembly state display area 602. The part selection area 601 displays names of parts constituting the assembled product for each assembly, for example.

The assembly state display area 602 displays, in an initial state, an image of the assembled product in a completed state (for example, all parts in an assembled state). When a name of the part is selected in the part selection area 601, for example, an arrow indicating a disassembly direction in which the part can be disassembled in a current state is displayed in the assembly state display area 602. The part selection area 601 may display only the name of the part that can be disassembled in the current state.

When one of the arrows indicating the disassembly direction is selected in the assembly state display area 602, the part to be disassembled and the disassembly direction in step S505 are determined, and the part is disassembled in step S506. In the assembly state display area 602, an image of the assembled product in a state where the part is disassembled is displayed.

In the example of FIG. 6, each assembly includes only one part, but the assembly may include a plurality of parts. When a part in an assembly that includes a plurality of parts is selected, a part that belongs to another assembly cannot be selected until all parts that belong to the assembly are disassembled (that is, until all the parts that belong to the assembly are disassembled, only the parts that belong to the assembly are taken as the part to be disassembled in step S503). When an attribute value of the assembly includes a type as a purchased product, the parts may be disassembled as one single part.

The description returns to FIG. 5. When it is determined that no part that can be disassembled remains in step S503 (S503: no), the assembly partial-order graph generation unit 111 determines whether all the parts of the assembled product are disassembled (S507). When it is determined that all the parts of the assembled product are disassembled (S507: yes), the assembly partial-order graph generation unit 111 generates an assembly partial-order graph by reversing a disassembly order of the parts (that is, the execution order of the assembly) (that is, the assembly related to previously disassembled parts is positioned on a root node side) (S508).

That is, based on a selection order of the parts to be disassembled, the assembly partial-order graph generation unit 111 can derive a partial-order graph of a disassembly operation having each assembly as a node, and can generate a partial-order graph showing an assembly operation having each assembly as the node by reversing a direction of the arc of the partial-order graph showing the disassembly operation.

Subsequently, the assembly partial-order graph generation unit 111 outputs the generated assembly partial-order graph (S509), and ends the assembly partial-order graph generation processing. The calculation result display unit 118 may display the assembly partial-order graph on the display 109 or the like.

When it is determined that a part that is not disassembled is present in step S507 (S507: no), that is, when it is determined that a part that cannot be disassembled is present, the calculation result display unit 118 outputs an error display such as "ASSEMBLY FAILS" to the display 109 (S510), and the assembly partial-order graph generation unit 111 ends the assembly partial-order graph generation processing.

FIG. 7 is an example of the assembly partial-order graph showing an assembly operation generated by the assembly partial-order graph generation processing. In the assembly partial-order graph of FIG. 7, the graph includes nodes each represented by an ellipse and arcs each represented by an arrow showing an order between two nodes. The nodes of the assembly partial-order graph show the assembly operation (the assembly). A constraint is shown that an assembly at a tip of the arc that must be performed before an assembly at a root of the arc. A partial order is a constraint relationship in such a partial order.

FIG. 8 is a flowchart showing an example of a robot cell plan generation processing. The assembly partial-order graph output by the assembly partial-order graph generation unit 111 in step S509 is input to the combination generation unit 112 (S801). The combination generation unit 112 calculates all combinations of leaf nodes of the assembly partial-order graph (S802). However, the leaf nodes included in the combination are equal to or less than the number of robots shown by the robot cell configuration data 124, and equal to or less than a total number of leaf nodes included in the assembly partial-order graph.

The combination generation unit 112 determines whether an unselected combination is present among the combinations of the leaf nodes calculated in step S802 (S803). When it is determined that an unselected combination is present (S803: yes), the combination generation unit 112 selects one combination of leaf nodes from the unselected combinations (S804).

The combination generation unit 112 calculates all allocation patterns of allocating the robot to each leaf node included in selected combinations of leaf nodes (S805). However, the combination generation unit 112 excludes, from the allocation patterns calculated in step S805, an allocation pattern in which a robot that cannot be attached with a hand corresponding to a part shown by a leaf node in the part and hand correspondence table 122 executes an operation shown by the leaf node.

The combination generation unit 112 determines whether there are unselected allocation patterns among the allocation patterns calculated in step S805 (S806). When it is determined that an unselected allocation pattern is present (S806: yes), the combination generation unit 112 selects one allocation pattern from the unselected allocation patterns (S807).

FIG. 9 is an example of allocation of a robot to a combination of leaf nodes in an assembly partial-order graph. The assembly partial-order graph of FIG. 9 is the same as the assembly partial-order graph of FIG. 7, and includes five leaf nodes of an assembly 11 to an assembly 15. It is assumed that three robots including a robot 1 to a robot 3 can be used.

In the example of FIG. 9, in step S802, all combinations of a number equal to or less than the number of robots, that is, equal to or less than three, of leaf nodes selected from the assembly 11 to the assembly 15 are calculated. In step S804, a combination of three leaf nodes including the assembly 12, the assembly 13, and the assembly 15 is selected.

In the example of FIG. 9, in step S805, all the allocation patterns of allocating one of the robot 1 to the robot 3 to each of the assembly 12, the assembly 13, and the assembly 15 are calculated. In these allocation patterns, different robots that can execute at the same time are allocated without allocating the same robot to different leaf nodes.

In the example of FIG. 9, in step S807, an allocation pattern in which the robot 3 is allocated to the assembly 12, the robot 1 is allocated to the assembly 13, and the robot 2 is allocated to the assembly 15 is selected.

The description returns to FIG. 8. Subsequently, the combination generation unit 112 refers to the part and hand correspondence table 122, and specifies, for the allocation pattern selected in step S807, a hand corresponding to the part to be assembled in the assembly that is a leaf node and the robot allocated to the assembly (S808).

The operation sequence allocation unit 113 refers to the operation sequence template 123, and allocates an operation sequence to each robot (S809). Specifically, for example, the operation sequence allocation unit 113 allocates, to each robot, an operation sequence corresponding to a condition based on an attached hand by the robot (that is, a hand used for an assembly operation performed last time), and a hand used for an assembly operation performed by the robot this time shown by the operation sequence template 123.

FIG. 10 is an example of an operation sequence when a robot is attached with a hand and assembles a plurality of parts using the hand. In the operation sequence of FIG. 10, the robot uses a hand a to assemble a part A1, and directly uses the hand a to assemble a part A2. The operation sequence of FIG. 10 is an operation sequence corresponding to "not attached" in the attached hand, "a" in the used hand, and "A1, A2" in the part in the operation sequence template 123.

First, the robot moves to a holder position of the hand a to attach the hand a (attach hand a). The robot moves to a feeder position for supplying the part A1, and holds the part A1 with the hand (feed A1). The robot moves to an approach position of an assembly position of the part A1 (approach A1). The robot moves to the assembly position of the part A1 to assemble the part A1 (subassembly A1).

Then, the robot moves to the approach position of the assembly position of the part A1 so as to depart (depart A1). The robot moves to a feeder position for supplying the part A2, and holds the part A2 with the hand (feed A2). The robot moves to an approach position of an assembly position of the part A2 (approach A2). The robot moves to the assembly position of the part A2 to assemble the part A2 (subassembly A2).

FIG. 11 is an example of an operation sequence when the robot is attached with the hand, assembles the part using the hand, and then replaces the hand and assembles the next part. In the operation sequence of FIG. 5, the robot is attached with a part A using the hand a, and then removes the hand a and attaches a hand b to assemble apart B. The operation sequence of FIG. 11 is an operation sequence corresponding to "not attached" in the attached hand, "a, b" in the used hand, and "A, B" in the part in the operation sequence template 123.

First, the robot moves to the holder position of the hand a to attach the hand a (attach hand a). The robot moves to a feeder position for supplying the part A, and holds the part A with the hand (feed A). The robot moves to an approach position of an assembly position of the part A (approach A). The robot moves to the assembly position of the part A to assemble the part A (subassembly A).

Then, the robot moves to an approach position of the assembly position of the part A so as to depart (depart A). The robot moves to the holder position of the hand a to remove the hand a (detach hand a). The robot moves to a holder position of the hand b to attach the hand b (attach hand b). The robot moves to a feeder position for supplying the part B, and holds the part B with the hand (feed B).

The robot moves to an approach position of an assembly position of the part B (approach B). The robot moves to the assembly position of the part B to assemble the part B (subassembly B). In the examples of FIGS. 10 and 11, the operation sequence is ended by assembling the part, but for example, an operation sequence may be ended by removing the attached hand at the holder position.

Since the operation sequence is defined according to the conditions related to the used hand or the attached hand in the operation sequence template 123, it is possible to plan an efficient plan for executing two assembly operations without removing the hand once attached to the robot particularly as shown in FIG. 10. The operation sequence template 123 may be defined by a condition related to only the attached hand without including the condition related to a hand in use.

For example, in the example of FIG. 9, since all the three robots perform an initial assembly operation, no hand is attached. Accordingly, an operation sequence is allocated to each of the three robots starting from the operation of attaching the hand (attach) as shown in FIG. 10 or FIG. 11.

The description returns to FIG. 8. Subsequently to step S809, the trajectory generation unit 114 generates a trajectory of each robot in each leaf node based on the allocated operation sequence and robot cell data (S810).

Specifically, the trajectory generation unit 114 generates a trajectory through which each robot passes based on the operation sequence in the operation sequence template 123 and positions of the robots and parts shown by the robot cell configuration data 124.

Specifically, the trajectory generation unit 114 calculates, for each point on the trajectory, a time point at which the robot is at the point based on a required time for each operation included in the operation sequence shown by the operation sequence template 123, and a movement time between operations based on the position information and the movement speed of the robot shown by the robot cell configuration data 124.

For example, when a plurality of hands specified in the operation sequence exist in a cell layout and are positioned at different places, the trajectory generation unit 114 is only required to generate, for example, a trajectory in which the robot takes a hand at a position where the movement time of the robot is the shortest. In a trajectory interference check, which will be described later, when the trajectories generated such that the movement time is shortest interfere with each other, the trajectory generation unit 114 may generate a trajectory in which the robot takes a different hand.

Subsequently, the trajectory interference check unit 115 determines whether the trajectory of the robot interferes with the trajectory of another robot (S811). Specifically, for example, the trajectory interference check unit 115 checks the trajectory interference by determining whether the robots and the attached hands may be positioned simultaneously in the same area based on the position and posture of the robots and the attached hands on the trajectory of each robot at each time point.

Even if the trajectory interference check unit 115 determines that the trajectory of the robot interferes with the trajectory of another robot, when the trajectory generation unit 114 can calculate an interference avoidance trajectory that does not cause interference with another robot (for example, change the trajectory of a certain robot, or temporarily pause a certain robot midway on the trajectory), the trajectory interference check unit 115 replaces an original trajectory with the interference avoidance trajectory, and determines in step S811 that the trajectories do not interfere with each other.

When the trajectory interference check unit 115 determines that the trajectories interfere with each other (S811: yes), the processing returns to step S806. When the trajectory interference check unit 115 determines that the trajectories do not interfere with each other (S811: no), the operation time calculation unit 116 calculates an operation time of the operation sequence of each robot (S812). The operation time calculation unit 116 calculates the operation time of a series of operation sequences from the required time of each operation including the movement time between the operations calculated in step S810. However, when the assembly operation of two parts has the partial-order relationship as described below, the operation time calculation unit 116 calculates the operation time in consideration of the partial-order relationship.

For example, in the example of the partial-order graph in FIG. 9, it is assumed that the robot 1 is allocated to the assembly 15 that is a leaf node, robots other than the robot 2 are allocated to the assembly 11 to assembly 14 that are other leaf nodes, and the robot 2 is allocated to the assembly 10 that is a parent node of the assembly 15.

In such a case, the robot 2 cannot assemble parts in the assembly 10 unless the robot 1 ends the assembly 15. However, the robot 2 may be capable of attaching the hand or moving to the approach position of the assembly position of the part in the assembly 10 even if the assembly 15 is not ended. In such a case, by calculating the operation time as described below, the shortest operation time required for the assembly 10 can be calculated.

FIG. 12 is a diagram showing a method of calculating the operation time when the assembly operation of two parts has the partial-order relationship. In an example of FIG. 12, the robot 1 executes an operation sequence to assemble the part A while the robot 2 executes an operation up to move to the approach position of assembly of the part B in the operation sequence to assemble the part B.

Then, when the robot 2 moves to the approach position of assembly, the robot 2 starts the assembly of the part B if the operation sequence by the robot 1 is not ended, waits at the approach position of the assembly position if the operation sequence by the robot 1 is not ended, and starts the assembly of the part B at the end of the operation sequence by the robot 1 (that is, departing to the approach position of the assembly position of the part A). Thus, since the robot 2 waits until the robot 1 departs to the approach position of the assembly position of the part A, a possibility that the robot 1 and the robot 2 interfere with each other can be reduced.

Here, the operation time of the operation sequence by the robot 1 is referred to as T1, the operation time up to move to the approach position of assembly of the part B in the operation sequence by the robot 2 is referred to as T2, and the operation time after moving to the approach position of assembly of the part B in the operation sequence by the robot 2 is referred to as T3. At this time, an operation time T until both the operation sequence by the robot 1 and the operation sequence by the robot 2 end is T=Ta+T3 (Ta=max(T1,T2)).

The description returns to FIG. 8. Subsequently to step S812, the processing returns to step S806. When the combination generation unit 112 determines that all the allocation patterns are selected in step S806 (S806: no), the processing returns to step S803.

When the combination generation unit 112 determines that an unselected combination is not present among the combinations of the leaf nodes in step S803 (S803: no), the operation time evaluation unit 117 specifies the allocation pattern of the leaf nodes and the robots that minimizes the operation time (S813). The allocation pattern with the minimized operation time is the allocation pattern with the earliest time point at which the operation of all leaf nodes included in the allocation pattern ends. The allocation pattern in which a total of the operation time of all leaf nodes included in the allocation pattern is minimized may be interpreted as the allocation pattern in which the operation time is minimized.

The operation time evaluation unit 117 may specify an allocation pattern of the leaf nodes and the robots that minimizes the cost of the robot, which is obtained by multiplying a predetermined cost per time of the robot by the operation time of the robots.

Subsequently, the operation time evaluation unit 117 outputs the operation sequence of the robot in the allocation pattern specified in step S813 (S814). The combination generation unit 112 deletes the leaf nodes and the arcs connected to the leaf nodes in the allocation pattern of the leaf nodes and the robots specified in step S813 from the assembly partial-order graph, and updates the assembly partial-order graph (S815).

FIG. 13 is an example of an updated assembly partial-order graph. In the assembly partial-order graph of FIG. 9, in the processing of step S813, the robots are allocated to the assembly 12, the assembly 13, and the assembly 15 that are leaf nodes, and in step S815, the leaf nodes and arcs connected to the leaf nodes are deleted.

The description returns to FIG. 8. Subsequently to step S815, the operation time evaluation unit 117 determines whether operation sequences corresponding to all nodes in the assembly partial-order graph are output (S816). When the operation time evaluation unit 117 determines that a node in the operation sequence that has not been output is present (S816: no), the processing returns to step S802. When the operation time evaluation unit 117 determines that the operation sequences corresponding to all the nodes are output (S816: yes), the processing is ended.

The robot cell planning device 100 advances the processing of allocating the assembly operation to the robot based on the operation time while removing the leaf node from the assembly partial-order graph by the above processing. Accordingly, the robot cell planning device 100 can generate a robot cell plan which can be executed without interference by robots and which has a high throughput of operation by a plurality of robots.

Second Embodiment

Differences from the first embodiment will be described. The robot cell planning device 100 of the present embodiment generates a robot cell plan for a plurality of robot cell layout plans. That is, the robot cell planning device 100 can receive registration of the robot cell configuration data 124 showing a plurality of different cell layouts.

As described with reference to FIGS. 4A and 4B, in each layout plan, the user can freely set arrangement of the devices, the number of robots, the number of hands, the number of hand holders, the number of part feeders, and the like.

FIG. 14 is a flowchart showing an example of a robot cell planning processing for a plurality of layout plans. The robot cell planning device 100 receives registration of the robot cell configuration data 124 showing a plurality of cell layout plans from the user (S1401). The combination generation unit 112 determines whether an unselected layout plan is present (S1402).

When it is determined that an unselected layout plan is present (S1402: yes), the combination generation unit 112 selects one layout plan from the unselected layout plans (S1403). The robot cell planning device 100 executes the robot cell plan generation processing shown in FIG. 8 for the selected layout plan (S800), and the processing returns to step S1402. When the processing in step S800 is executed, the allocation of the robots to the leaf nodes, the operation sequences of the robots, and the operation times are output for the selected layout plan.

When the combination generation unit 112 determines that all the layout plans are selected (S1402: no), the calculation result display unit 118 displays the operation time for each layout plan (S1404). In addition, the calculation result display unit 118 may display the allocations of the robots to the leaf nodes, the operation sequences of the robots, and the costs of the robots for each of the layout plans.

As described above, since the robot cell planning device 100 according to the present embodiment can generate and display a robot cell plan for a plurality of layout plans, the user can compare and discuss production amounts and the introduction costs of the cells for the layout plans.

The invention is not limited to the above embodiments, and includes various modifications. For example, the embodiments described above have been described in detail for easy understanding of the invention, and the invention is not necessarily limited to those including all of the configurations described above. Apart of a configuration of one embodiment can be replaced with a configuration of another embodiment, and the configuration of another embodiment can be added to the configuration of one embodiment. In addition, a part of the configuration of one embodiment may be added, deleted, or replaced with another configuration.

A portion or all of the configurations, functions, processing units, processing methods or the like described above may be implemented by hardware such as through design using an integrated circuit. Each of the configurations, functions, or the like described above may be implemented by software by interpreting and executing a program for implementing respective functions by the processor. Information such as a program, a table, and a file for implementing each function can be stored in a recording device such as a memory, a hard disk, or a solid state drive (SSD), or in a recording medium such as an IC card, an SD card, or a DVD.

Control lines and information lines indicate what is considered necessary for description, and not all control lines and information lines in the products are shown. It may be considered that almost all the configurations are actually connected to each other.

REFERENCE SIGN LIST

100: robot cell planning device
101: processor
102: memory
103: auxiliary storage device
111: assembly partial-order graph generation unit
112: combination generation unit
113: operation sequence allocation unit
114: trajectory generation unit
115: trajectory interference check unit
116: operation time calculation unit
117: operation time evaluation unit
118: calculation result display unit
119: robot operation display unit
121: assembled product model data
122: part and hand correspondence table
123: operation sequence template
124: robot cell configuration data

The invention claimed is:

1. An assembly planning device configured to plan assembly of parts by a plurality of robots, the assembly planning device comprising:
a processor and a memory,
wherein the memory stores:
a partial-order graph indicating assembly operations of the parts and an order constraint based on a partial-order relationship of the assembly operations, the partial-order graph is represented by nodes, each indicating an assembly operation, and arcs indicating an order among the nodes, and the order constraint indicates that the assembly operation at one end of a respective arc must be completed before the assembly operation at another end of the respective arc;
an operation sequence template indicating an operation sequence that indicates a series of operations executed by the robots in the assembly operation of each of the parts and a required time of the operation sequence, the operation sequence template further indicating, for each operation sequence, whether a device is attached to a respective robot at a time when the robot starts the operation sequence, information indicating a device used by the robot during execution of the operation sequence, and a part to be assembled by the robot by executing the operation sequence;
part information indicating respective parts to be assembled by each of the plurality of robots; and
layout information of a cell in which the assembly operation is executed,
wherein the processor is configured to:
refer to the part information so as to generate a plurality of allocation plans in which the robots assembling the part in each of the assembly operations indicated by the partial-order graph are allocated to the assembly operation;
for each of the plurality of the allocation plans:
refer to the operation sequence template to allocate the operation sequence for each assembly operation indicated by the allocation plan,
refer to the layout information to calculate movement times of the robots indicated by the allocation plan in the allocated operation sequence, and
calculate an operation time in the allocation plan based on the movement times and the required time indicated by the operation sequence template, and
wherein the memory stores geometric constraint information between each part in an assembled product in which the parts are assembled, and
wherein the processor is configured to:
repeat a disassembly processing of the assembled product until all parts are the disassembly processing including:
specifying parts capable of being disassembled in the assembled product based on the geometric constraint information,
displaying, on a screen of a display, a plurality of graphical representations of each of the specified parts in the assembled product, the graphical representations being acquired, in part, from attribute information of one or more parts from a computer aided design (CAD) information,
receiving a selection of a part on the screen and a disassembly direction on the screen among the displayed specified parts, and
updating the assembled product with a new assembled product obtained by disassembling the selected part; and generating the partial-order graph by determining the order constraint based on the part capable of being disassembled at each time point in the repeated disassembly processing, and select an allocation plan included in the plurality of allocation plans based on the operation times, and wherein the robots execute the operations according to the series of operations of the operation sequence to assemble the parts.

2. The assembly planning device according to claim 1, wherein the part information indicates the device that is used in assembling of each of the parts and that is to be attached to the robot, wherein the processor is configured to:

for each of the plurality of the allocation plans:
  specify the device that is attached to the robot at the start of each of the assembly operations, based on the order constraint indicated by the partial-order graph; and
  refer to the operation sequence template so as to allocate the operation sequence for each of the assembly operations based on the specified device.

3. The assembly planning device according to claim 2, wherein the operation sequence template includes an operation sequence in which in an operation of continuously assembling a plurality of parts capable of being assembled using the same device, the plurality of parts are continuously assembled without removing the same device from the robot.

4. The assembly planning device according to claim 1, wherein the processor is configured to:

in calculating the operation time for each of the plurality of allocation plans, when a first assembly operation and a second assembly operation preceding the first assembly operation under the order constraint are to be executed in the allocation plan, calculate an operation time when an operation sequence including the second assembly operation and an operation before the first assembly operation among the series of operations included in the operation sequence including the first assembly operation are executed in parallel, and when the first assembly operation is performed after the second assembly operation is ended.

5. The assembly planning device according to claim 1, wherein the processor is configured to:

repeat a robot allocation processing until a root node of the partial-order graph is reached; and in the robot allocation processing:
  select some or all leaf nodes in the partial-order graph,
  generate the plurality of allocation plans for assembly operations shown by the some or all leaf nodes, and
  delete a leaf node shown by the selected allocation plan from the partial-order graph, so as to update the partial-order graph.

6. The assembly planning device according to claim 1, wherein the memory:

stores the layout information of a plurality of cells, and wherein the processor is configured to:
  calculate the operation time for the layout information of each of the plurality of cells; and
  select a combination of a layout included in layouts of the plurality of cells and an allocation plan included in the plurality of allocation plans based on the operation times.

7. An assembly planning method performed by an assembly planning device for planning assembly of parts by a plurality of robots, wherein the assembly planning device includes a processor and a memory, the method comprising:

storing, in the memory:
  a partial-order graph indicating assembly operations of the parts and an order constraint based on a partial-order relationship of the assembly operations, the partial-order graph is represented by nodes, each indicating an assembly operation, and arcs indicating an order among the nodes, and the order constraint indicates that the assembly operation at one end of a respective arc must be completed before the assembly operation at another end of the respective arc;
  an operation sequence template indicating an operation sequence that indicates a series of operations executed by the robots in the assembly operation of each of the parts and a required time of the operation sequence, the operation sequence template further indicating, for each operation sequence, whether a device is attached to a respective robot at a time when the robot starts the operation sequence, information indicating a device used by the robot during execution of the operation sequence, and a part to be assembled by the robot by executing the operation sequence;
  part information indicating respective parts to be assembled by each of the plurality of robots; and
  layout information of a cell in which the assembly operation is executed, and by the processor, referring to the part information so as to generate a plurality of allocation plans in which the robots assembling the part in each of the assembly operations indicated by the partial-order graph are allocated to the assembly operation;

by the processor, for each of the plurality of the allocation plans:
  referring to the operation sequence template to allocate the operation sequence for each assembly operation shown by the allocation plan,
  referring to the layout information to calculate movement times of the robots indicated by the allocation plan in the allocated operation sequence, and
  calculating an operation time in the allocation plan based on the movement times and the required time indicated by the operation sequence template;

storing, by the memory, geometric constraint information between each part in an assembled product in which the parts are assembled;

repeating a disassembly processing of the assembled product until all parts are the disassembly processing including:

specifying parts capable of being disassembled in the assembled product based on the geometric constraint information, displaying, on a screen of a display, a plurality of graphical representations of each of the specified parts in the assembled product, the graphical representations being acquired, in part, from attribute information of one or more parts from a computer aided design (CAD) information, receiving a selection of a part on the screen and a disassembly direction on the screen among the displayed specified parts, and updating the assembled product with a new assembled product obtained by disassembling the selected part; and generating the partial-order graph by determining the order constraint based on the part capable of being disassembled at each time point in the repeated disassembly processing; and by the processor, selecting an allocation plan included in the plurality of allocation plans based on the operation times, wherein the robots execute the operations according to the series of operations of the operation sequence to assemble the parts.

8. The assembly planning method according to claim 7, wherein the part information indicates the device that is used in assembling of each of the parts and that is to be attached to the robot, and wherein the assembly planning method further comprises:

for each of the plurality of the allocation plans by the processor:

specifying the device that is attached to the robot at the start of each of the assembly operations, based on the order constraint indicated by the partial-order graph; and referring to the operation sequence template so as to allocate the operation sequence for each of the assembly operations based on the specified device.

9. The assembly planning method according to claim 8, wherein the operation sequence template includes an operation sequence in which in an operation of continuously assembling a plurality of parts capable of being assembled using the same device, the plurality of parts are continuously assembled without removing the same device from the robot.

10. The assembly planning method according to claim 8, comprising:

by the processor, in calculating the operation time for each of the plurality of allocation plans, when a first assembly operation and a second assembly operation preceding the first assembly operation under the order constraint are to be executed in the allocation plan, calculating an operation time when an operation sequence including the second assembly operation and an operation before the first assembly operation among the series of operations included in the operation sequence including the first assembly operation are executed in parallel, and when the first assembly operation is performed after the second assembly operation is ended.

11. The assembly planning method according to claim 8, comprising:

by the processor, repeating a robot allocation processing until a root node of the partial-order graph is reached; and in the robot allocation processing:

by the processor, selecting some or all leaf nodes in the partial-order graph;

by the processor, generating the plurality of allocation plans for assembly operations shown by the some or all leaf nodes; and by the processor, deleting a leaf node shown by the selected allocation plan from the partial-order graph, so as to update the partial-order graph.

12. The assembly planning method according to claim 8, further comprising:

storing, by the memory, the layout information of a plurality of cells;

by the processor, calculating the operation time for the layout information of each of the plurality of cells; and by the processor, selecting a combination of a layout included in layouts of the plurality of cells and an allocation plan included in the plurality of allocation plans based on the operation times.

13. A non-transitory computer-readable storage medium having stored thereon an assembly planning program for causing an assembly planning device to plan an assembly of parts by a plurality of robots, wherein the assembly planning device includes a processor and a memory, the program, upon execution by the processor, configures the processor to perform steps comprising:

storing, by the memory:

a partial-order graph indicating assembly operations of the parts and an order constraint based on a partial-order relationship of the assembly operations, the partial-order graph is represented by nodes, each indicating an assembly operation, and arcs indicating an order among the nodes, and the order constraint indicates that the assembly operation at one end of a respective arc must be completed before the assembly operation at another end of the respective arc;

an operation sequence template indicating an operation sequence that indicates a series of operations executed by the robots in the assembly operation of each of the parts and a required time of the operation sequence, the operation sequence template further indicating, for each operation sequence, whether a device is attached to a respective robot at a time when the robot starts the operation sequence, information indicating a device used by the robot during execution of the operation sequence, and a part to be assembled by the robot by executing the operation sequence;

part information indicating respective parts to be assembled by each of the plurality of robots; and layout information of a cell in which the assembly operation is executed, and a step of referring to the part information so as to generate a plurality of allocation plans in which the robots capable of assembling the part in each of the assembly operations indicated by the partial-order graph are allocated to the assembly operation;

for each of the plurality of the allocation plans:

a step of referring to the operation sequence template to allocate the operation sequence for each assembly operation shown by the allocation plan, a step of referring to the layout information so as to calculate movement times of the robots indicated by the allocation plan in the allocated operation sequence, and a step of calculating an operation time in the allocation plan based on the movement times and the required time indicated by the operation sequence template; and storing, by the memory, geometric constraint information between each part in an assembled product in which the parts are assembled;

repeating a disassembly processing of the assembled product until all parts are the disassembly processing including:

specifying parts capable of being disassembled in the assembled product based on the geometric constraint information, displaying, on a screen of a display, a plurality of graphical representations of each of the specified parts in the assembled product, the graphical representations being acquired, in part, from attribute information of one or more parts from a computer aided design (CAD) information, receiving a selection of a part on the screen and a disassembly direction on the screen among the displayed specified parts, and updating the assembled product with a new assembled product obtained by disassembling the selected part; and generating the partial-order graph by determining the order constraint based on the part capable of being disassembled at each time point in the repeated disassembly processing; and a step of selecting an allocation plan included in the plurality of allocation plans based on the operation times, wherein the robots execute the operations according to the series of operations of the operation sequence to assemble the parts.

\* \* \* \* \*